J. ROLLMAN.
Thrashing Machine.
No. 25,527.
Patented Sept. 20, 1859.
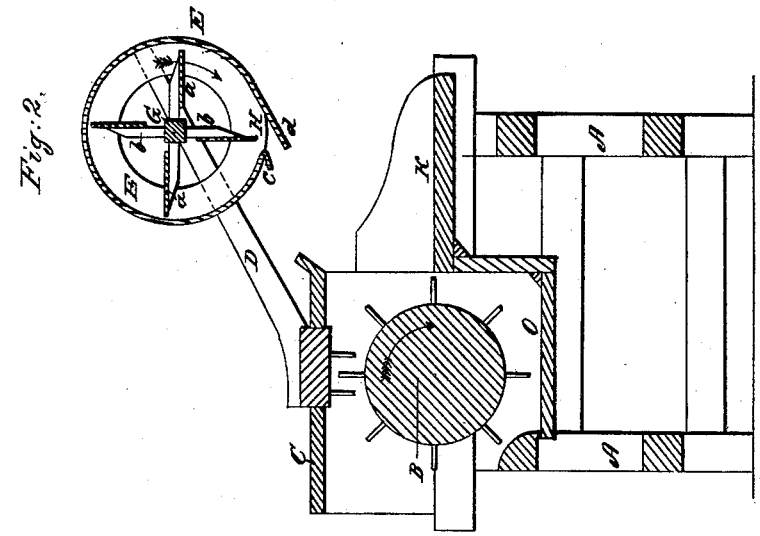
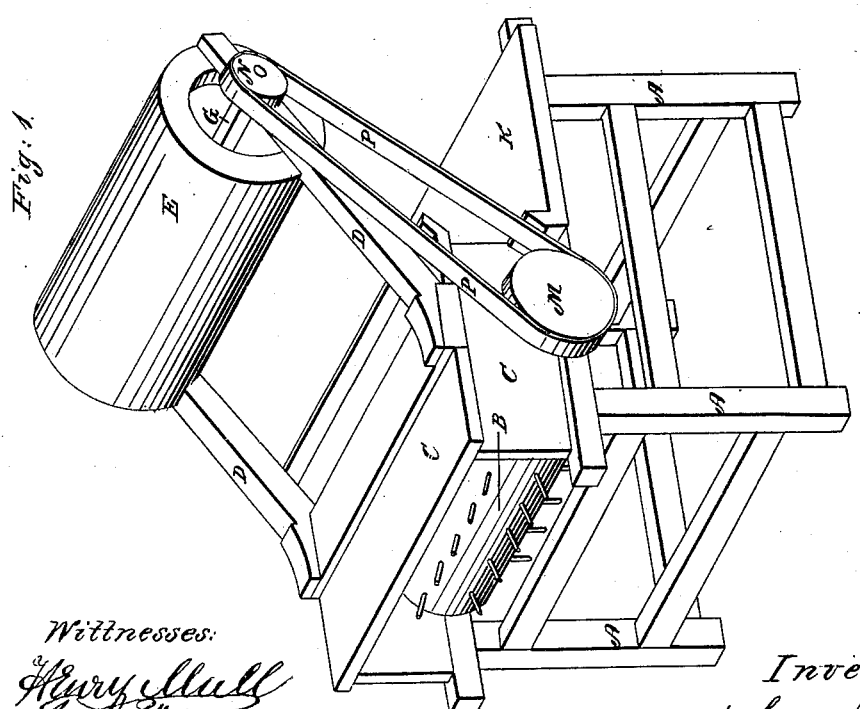
Witnesses:
Henry Mull
Isaac Mall
Inventor:
Joshua Rollman

UNITED STATES PATENT OFFICE.

JOSHUA ROLLMAN, OF SINKING SPRINGS, PENNSYLVANIA.

THRESHING-MACHINE.

Specification of Letters Patent No. 25,527, dated September 20, 1859.

*To all whom it may concern:*

Be it known that I, JOSHUA ROLLMAN, of Sinking Springs, in the county of Berks and State of Pennsylvania, have invented certain new and useful Improvements in Threshing-Machines; and I do hereby declare that the following is a full, clear, and exact description of the construction and operation of the same, reference being had to the accompanying drawings, in which—

Figure 1, represents a perspective view of said machine. Fig. 2, represents a longitudinal vertical section through the same.

The nature of my invention relates to the application of an independent fan blower to a threshing machine, the blast of which is intended to prevent any dust arising from the operation of threshing, from reaching the attendant who feeds the grain to the machine, thus greatly facilitating the work of the operator.

To enable others skilled in the art to make and use my invention I will proceed to describe its construction and operation.

A, represents the frame of the machine.

B, represents the threshing cylinder, which is of the usual construction, and which runs within a box O, and a concave which, as it does not constitute a part of this invention, needs no further description.

C, represents a box which covers the threshing cylinder, and which is open in front for the admission of the grain and open in rear for the discharge of the straw.

D, represents two arms, which are secured to the box C, and to which the drum E, is attached; they also serve as the bearings of the fan shaft G, which passes through and revolves, within the box E, and to which the wings $a$, are secured by means of the arms $b$. The drum E, is open at both its ends for the admission of air and the blast created by the wings $a$, passes out through the passage H, which extends through the entire length of the drum and is directed toward the threshing cylinder by the two wind boards $c$ and $d$.

K represents the table or platform, over which the grain is fed to the threshing cylinder B, and the attendant who regulates the feed stands forward of said cylinder, and right under the drum E. The threshing cylinder B, is operated in the usual manner, and the fan $a$, is revolved by means of a belt P, which passes over the pulleys M, and N, they being secured respectively to the shaft of the threshing cylinder and to the shaft G, of the fan blower.

As the cylinder B, revolves with great velocity, in the grain to be threshed, the dust escapes through the open ends of the box C, but the blast coming from the drum E, and in the direction of the threshing cylinder drives the dust back through the front end of the box, and out to the rear and the operator who stands in front of the box C, and under the drum E, is thus effectually protected against said dust.

I am aware that in machines for threshing and cleaning grain and where a fan blower is necessarily used openings have been made to allow the fan to blow the dust away from the attendant, but this makes the position of the fan as well as the opening an arbitrary matter, as the fan must be located with special regard to its other functions, and the opening must be where the fan so restricted in location will admit of its being placed. My arrangement contemplates the use of a separate fan, and can be applied to a thresher where there is no cleaning fan, and in a space most efficient and out of the way of the operator or the mechanism used for threshing.

Having thus fully described the nature of my invention, what I claim therein as new and desire to secure by Letters Patent is,

The application to a threshing machine of one or more independent fan blowers, which are attached outside of the machine, and in such position as to prevent any dust arising from the operation of threshing, from reaching the attendant on the machine, when arranged and operated, substantially in the manner herein described.

JOSHUA ROLLMAN.

Witnesses:
HENRY MULL,
AARON MULL.